3,341,292
FLUORO COMPOUND SYNTHESIS

Abe F. Maxwell, Morris Township, Morris County, Robert L. Sturtevant, Morristown, and Bernard Sukornick, Elizabeth, N.J., assignors to Allied Chemical Corporation, New York, N.Y., a corporation of New York
No Drawing. Filed Aug. 15, 1962, Ser. No. 218,480
13 Claims. (Cl. 23—203)

This invention relates to processes for manufacture of trifluoroamine oxide, $F_3NO$, normally a colorless gas having boiling point of about minus 89° C. and a melting point of about minus 161° C. $F_3NO$, a known compound, provides a missile ingredient, a powerful high energy oxidizer for missile fuels, and an intermediate for the preparation of other high energy propellant oxidizers. Trifluoroamine oxide is further useful to lower substantially the freezing point of the known $N_2O_4$ oxidizer, and correspondingly increases the utility range of $N_2O_4$.

Objectives of the invention are to provide processes for making $F_3NO$ by commercially feasible procedures which facilitate use of readily available compounds as starting materials.

In accordance with the invention, it has been found that nitric oxide (NO) and elemental fluorine, when subjected to certain controlled reaction conditions, may be reacted to effect formation of trifluoroamine oxide. The invention includes discovery of the reactability of nitric oxide and elemental fluorine to form $F_3NO$, and of certain reaction conditions which interdependently cooperate to constitute practicable and easily controllable gas-phase methods for making $F_3NO$ in yields notably higher than heretofore attainable.

Practice of the invention, in the broader aspects, comprises introducing into, and preferably bringing together in, a reaction zone gaseous elemental fluorine and gaseous nitric oxide, regulating the relative rates of feed of fluorine and nitric oxide and relative proportions of fluorine and of nitric oxide so as to maintain in the reaction zone spontaneous exothermic reaction of fluorine and nitric oxide, and discharging from the reaction zone reaction products containing trifluoroamine oxide.

While the mechanics of the reactions effected are not understood, it is believed that the overall reactions involved may be summarized by

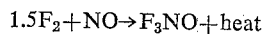
$$1.5F_2 + NO \rightarrow F_3NO + heat$$

Practice of the invention comprises broadly reaction of elemental fluorine and nitric oxide at evidently at least initially very high temperatures to form reaction products containing $F_3NO$, and, in the preferred embodiments, the high temperature reaction of fluorine and NO coordinated with an immediately succeeding abrupt shock-cooling or quenching of reaction products, followed by discharge from the quenching zone of reaction products containing the sought-for $F_3NO$.

This invention is based largely on the discovery that elemental fluorine and nitric oxide react spontaneously to form $F_3NO$. We find that when elemental fluorine and nitric oxide each initially at room temperature, are introduced into, and preferably with good gas mixing conditions are brought together in, a reaction zone, fluorine and NO react spontaneously and highly exothermically to form reaction products containing $F_3NO$, this being the situation when the reactor is maintained in an atmosphere of ambient temperature, i.e. when the reactor is enveloped by ordinary atmospheric conditions, or when heat or cooling medium is externally applied to the reactor. Fluorine and nitric oxide preferably are fed into the reactor as separate gas streams, apparatus equipment being preferably such that the two gas streams are charged into the head of the reaction zone in impinging or other relation which effects a high degree of mixing of the gases at or near the point of initial contact of the respective gas streams. Investigations show that when incoming fluorine and nitric oxide are impingingly, or more or less jet-fed into a reaction zone, reaction is spontaneous and exothermic to the point of development of an observable flame of temperatures thought to be well in excess of 800–1000° C. The existence and continuance of reaction in the reaction zone is evidenced by the readily determinable generation of heat in the reactor. Relative rates of feed of fluorine and of nitric oxide and relative proportions of fluorine and of nitric oxide need only be regulated in such a way as to maintain reaction in the reaction zone. Accordingly, when elemental fluorine and nitric oxide are fed to a reaction zone in quantities and proportions adjusted to maintain a spontaneous reaction in the reaction zone, $F_3NO$ is formed, and reaction products discharged from the reaction zone contain the same. To illustrate, gaseous fluorine and gaseous nitric oxide were charged into a T reactor substantially the same as described in appended Example 1 and not provided with a continguously associated quenching chamber. With fluorine and NO inputs adjusted to charge into the reactor about 0.160 mol/hr. (65 cc./min.) of fluorine and about 0.075 mol/hr. (30 cc./min.) of nitric oxide, with no extraneous heating or cooling of the obviously warm reactor, analysis of the reactor exit gases demonstrated the presence of $F_3NO$. Analyses of reaction products of all runs made show that the reactor exit contains NOF as a major by-product, indicating reaction of NO and fluorine to form some NOF. Formation of NOF from fluorine and NO results in release of large amounts of heat which is believed to be an important contributing factor involved in the successful formation of $F_3NO$.

Continued investigation showed that by lowering of reaction zone temperature as by external application of cooling medium to the reactor, while still maintaining the substantially instantaneous reaction characteristics within the reactor, yield of $F_3NO$ is increased. It has been found that when the reactor, in which the spontaneous reaction is effected, is preferably substantially completely enveloped in a bath of a refrigerating fluid maintained at temperature substantially in the range of zero to about minus 135° C., notably greater yields of $F_3NO$ accrue. At fluid bath temperatures of say zero to minus 25° C., yields are improved, and yields appear to increase as bath temperature is decreased down to about minus 135° C. In order to avoid possible solidification of NOF, temperatures below about minus 135° C. are not preferred. In the better practice, bath temperatures are preferably maintained in the range of about minus 50° C. to minus 130° C., temperatures of about minus 125–130° C. being good representative working temperatures.

It has been found that in addition to the reaction zone temperature control indicated, best results, with regard to higher yields of $F_3NO$ and smoothness of operation, are related to a quick cooling or quenching of the gas mixture exiting the reaction zone. It is believed that immediate, substantially instantaneous cooling or quenching of reaction zone exit products decreases or minimizes $F_3NO$ decomposition, and in this manner $F_3NO$ yields are substantially enhanced. Whatever the reactions involved and the reasons for better yields may be, it is preferred, in better forms of practice of the invention, to abruptly discharge reaction zone reaction products into a quenching zone and immediately shock-cool such reaction products in the quenching zone to temperatures substantially in the range of minus 110 to minus 135° C. Temperatures in the lower portion of this range are more desirable, and good working temperatures are in the range of about minus 125° C. to minus 130° C. Such temperatures not below about minus 135° C. in general are low enough to effect incipient liquefaction of $F_3NO$ and NOF. While it is believed that the quenching temperatures noted closely approximate gas temperatures in the quenching zone, specifically such temperatures refer to the temperatures of a refrigerating bath in which the quenching zone or chamber is preferably substantially completely immersed. From practical and preferred viewpoints, the exit of the reactor and the inlet of the quenching chamber are contiguous and directly connected, thus contributing to and facilitating shock-cooling of reaction zone products almost immediately after formation of the same. Whatever actual localized gas temperatures in the reaction zone may be, in view of the low temperatures sought to be impressed upon the reactor and upon the quenching chamber, it will be understood that in the better embodiments of practice the reactor and the contiguous quenching chamber may be immersed in the same bath in which instance each of the reactor and the quenching chamber is substantially enveloped in a fluid medium maintained at temperatures substantially in the range of minus 110 to minus 135° C. The reactor and the quenching chamber may be immersed in separate baths maintained at the indicated temperatures, although such procedure affords no practical advantage.

Investigations indicate a close relationship between the above reaction zone temperatures and molecular proportions of elemental fluorine and nitric oxide charged to the reaction zone. As long as a spontaneous heat-evolving reaction takes place in the reactor, some $F_3NO$ is produced. Spontaneity of the reaction is in turn dependent upon relative rates of feed of fluorine and nitric oxide and relative proportions of fluorine and nitric oxide in such feed. Minimum rates of flow of fluorine and of NO, and practicable outside limits of proportioning of fluorine and of NO may be easily determined by the simple expedient of regulating flow and proportioning of the reactants to procure existence of a heat-evolving reaction in the reactor. While broadly, molecular proportioning of fluorine and NO, in conjunction with adequate flow rates to the reactor, may be anything suitable to maintain spontaneous reaction, in which instance some $F_3NO$ is produced, we find that in order to obtain $F_3NO$ yields of consequence mol ratios of fluorine to nitric oxide fed to the reactor should be substantially in the range of 0.75–2.5, preferably 1.0–2.4, mols of fluorine per mol of nitric oxide. Although stoichiometric proportions are thought to be about 1.5 mols of fluorine per mol of NO, it is found that in the more usual operations it is desirable to use at least one mol of fluorine per mol of nitric oxide, and proportions of fluorine in excess of about 1.5 mols per mol of NO are not preferred.

Residence time may be varied considerably without noticeable efficiency disadvantage. Generally, combined residence time in the reactor and quenching zone is relatively short. Residence time may be as little as about 0.5 second, and preferably not more than about 5–10 seconds. In some operations, dilution of reactants with inerts such as helium and argon improve $F_3NO$ yields, although in cases in which diluent is employed, diluent in excess of about 25% (volume) is not preferred. To a substantial extent, residence time, reactor temperature, ratios of reactants and use of gaseous inert diluent are interrelated, and depending upon apparatus and the particular operation at hand, optimum conditions regarding residence time and dilution may be determined by test runs.

While sub- or super-atmospheric pressures may be employed, the invention affords the highly practical advantage of operation at substantially atmospheric pressure. In the practice of gas-phase processes of the general type described herein, i.e. processes in which a gas stream is flowed successively thru reaction and product recovery systems, for all practical purposes, as relate to reactions themselves, pressure is considered as being substantially atmospheric. However, pressures in such systems are sufficiently on the positive side to effect commercially satisfactory gas flow thru the apparatus train. Thus, depending upon factors such as apparatus design, gas space in the reactor, desired residence time, etc., actual pressures in systems of the kind under consideration may vary from 2 up to say 10–15 pounds gauge, and accordingly operations of this type are included in the designation of substantially atmospheric pressure.

Apparatus which may be employed involves no particularly critical design, and in general may be similar to that described in the appended examples. Construction may be of nickel, Monel or stainless steel or other material corrosion-resistant to the reactants, products and by-products involved. Preferably the reactor is arranged for separate charging of metered quantities of fluorine and nitric oxide, and so that incoming reactants may be vigorously and well mixed immediately on initial contact in the reaction zone. The exit line of the reactor, or the exit of the quenching chamber if used in conjunction with the reactor as is preferred, may be connected to the inlet of a product recovery system.

The reactor exit contains $F_3NO$, NOF and, dependent upon variable reaction conditions, may contain some unreacted fluorine, and possibly some oxygen, nitrogen, $N_2O$ and $NO_2$. Recovery of $F_3NO$ and separation of the same from other materials contained in the gaseous exit of the reaction and quenching zone may be effected more or less conventionally as known in this art, i.e. by condensation, followed by suitable fractionation. For example, gases exiting from the reaction and quenching zones may be refrigerated by means of a cold tray to say minus 80° C. to remove a major portion of the NOF, B.P. minus 56° C., and any $NO_2$, M.P. minus 11.2° C. In this situation, $F_3NO$, small quantities of NOF, unreacted fluorine, and any nitrogen, oxygen, $N_2O$, and inert diluent (if used) is vented from the cold trap and passed into a second trap where these gases are refrigerated to say minus 180° C. so that $F_3NO$, M.P. minus 161° C., is condensed as a solid along with any NOF, M.P. minus 134° C., and $N_2O$, M.P. minus 102° C. Unreacted fluorine and any nitrogen, oxygen or inert diluent is vented from the cold trap. Further, purification of $F_3NO$ may be accomplished by carrying out a simple batch distillation on the materials collected in the minus 180° C. cold trap, $F_3NO$ being recovered as overhead product.

The following illustrate practice of the invention.

*Example 1.*—The reactor employed consisted of a Monel T having gas inlets at each end of the cross-piece and a gas outlet at the free end of the stem. The horizontal cross-piece was about 2″ long, and the stem was about 1″ long. Inside diameters of a cylindrical bore running the length of the cross-piece, and of a bore in the stem opening at one end into the cross-piece bore were about 3/16″. The inlet ends of the cross-piece were connected respectively, by 1/4″ O.D. copper tubing, to metered sources of gaseous elemental fluorine and gaseous nitric oxide (NO). The gas outlet line, connected at one end to the outlet end of the horizontally disposed stem bore or channel, consisted of a 1/4″ O.D. horizontally disposed nickel tube about 4 ft. long connected at the other end to continuous infrared monitoring and analytical apparatus. Design of the reactor was such that separate incoming streams of gaseous fluorine and nitric oxide were introduced coaxially and met head-on with intimate and vigorous mixing at the head of the 3/16″ channel in the stem of the T, which channel formed the reaction zone. Over a period of about 60 min., the flow rates of gaseous fluorine and gaseous nitric oxide inputs were adjusted so as to feed into the reactor about 0.160 mol per hour (65 cc./min.) of fluorine, and about 0.075 mol per hour (30 cc./min.) of nitric oxide. Fluorine and nitric oxide as charged to the reactor were at about room temperature, and pressure was roughly about 2 p.s.i.g. Reaction was spontaneous and highly exothermic. Substantially, immediately on initiation of reaction, infrared analysis of the reactor products discharged from the reactor showed the same to contain about 1–2% yield of F₃NO on the basis of the weight of the NO input. Nitrosyl fluoride (NOF) was the main by-product in the reaction products. When compressed air was blown across the reactor, flow rates being maintained the same, increase of F₃NO yield was observed. For a succeeding period of about 30 min., a stream of helium at temperature of about minus 196° C. was blown across the outside surface of the reactor. Exterior temperature of the reactor was believed to be reduced to the order of about minus 50° C. Flow rates of fluorine and nitric oxide were maintained as before, and yield of F₃NO rose to approximately 2–3% on the basis of the NO fed. Subsequently, the reactor and about a 4 in. length of the outlet line were submerged in a bath maintained at about minus 80° C. by a slush of Dry Ice and CCl₃F. On continued feed of fluorine and nitric oxide, at the rates indicated, yield of F₃NO rose to approximately 4 to 5%.

*Example 2.*—Apparatus employed was substantially the same as in Example 1 except that the T-shaped reactor was mounted so that the reactor outlet leg was on a vertical axis pointing down, and the reactor and also about an 8 in. length of the outlet tubing, contiguous to the reactor outlet and constituting a quenching zone, were totally enveloped in a refrigerated cold bath maintained at temperature of about minus 125–minus 130° C. by means of CCl₂F₂ and liquid nitrogen. Over a period of about 3 hrs., flow rates of fluorine and nitric oxide inputs were varied each within the range of 80–185 cc./min. Mol ratios of fluorine to nitric oxide varied in the range of 1.5:1 to 1:1. Under all conditions the reaction products contained good yields of F₃NO. Yields of 5 to 10% F₃NO on the basis of NO input were obtained when fluorine and nitric oxide flow rates were maintained at about 0.30 mol/hr. (120 cc./min.) each, F₂:NO mol ratio of 1:1; and at 0.30 mol/hr. (120 cc./min.) for fluorine and at 0.2 mol/hr. (80 cc./min.) for nitric oxide, F₂:NO mol ratio 1.5:1. In these instances, residence time in the reactor and quenching zone was about 1.1 and about 1.3 seconds respectively.

*Example 3.*—The reactor comprised a horizontally disposed ⅛ in. O.D., 1/16 in I.D. stainless steel tube 1.5″ long with a 1/16 in. hole at its center perpendicular to the tube axis. This tube was mounted and centered inside the horizontal cross-piece of a ¼″ I.D. T, with opposite ends of the tube common to the corresponding two inlets of the T, and with the 1/16 in. hole in the tube pointing into the vertical downwardly extending leg (outlet) of the T. In operation, fluorine passed into one end of the 1/16 in. tube, and nitric oxide into the other end of the tube, and the gases mixed in and exited the tube at the 1/16 in. hole, and reacted in the ¾ in. long vertical leg of the T. Reaction product gases then passed thru the outlet at the bottom of the T into an 8 in. length of ¼ in. I.D. tubing, connected directly to the T outlet and constituting a cooling or quenching chamber. The T, with the ⅛ in. tube mounted inside, and the quenching chamber were enveloped in a refrigerated bath maintained at about minus 125° to minus 130° C. as in Example 2. An F₃NO yield on basis of NO fed of from 3 to 4% was obtained when, for a period of about 1 hr., 0.30 mol/hr. (120 cc./min.) of fluorine and 0.30 mol/hr. (120 cc./min.) of nitric oxide were metered into the reactor inlets. The addition of a helium dilution of 0.06 mol/hr. (25 cc./min.) to the fluorine inlet stream increased the F₃NO yield to approximately 5%. A further increase in helium dilution to 0.18 mol/hr. (75 cc./min.) increased the F₃NO yield to 5 to 10%. Increasing the helium dilution to above 75 cc./min. tended to decrease the F₃NO yield. In the three foregoing detailed modifications, residence times in the reactor and quenching zone varied from about 1.1 to about 0.8 seconds.

The compound trifluoroamine oxide, F₃NO, of the structure—

is described and claimed in copending application Ser. No. 179,521, of Fox, MacKenzie and Vanderkooi, Jr., filed Mar. 9, 1962.

We claim:
1. The process for making trifluoroamine oxide which comprises introducing into the reaction zone of a reactor, gaseous elemental fluorine and gaseous nitric oxide, regulating relative rates of feed of fluorine and of nitric oxide and relative proportions of fluorine and of nitric oxide so as to maintain in the reaction zone spontaneous exothermic reaction of fluorine and nitric oxide, and discharging trifluoroamine oxide from the reaction zone.

2. The process of claim 1 in which fluorine and nitric oxide are charged in proportions of not less than one mol of fluorine per mol of nitric oxide.

3. The process of claim 1 in which fluorine and nitric oxide are charged in proportions of substantially 0.75–2.5 mols of fluorine per mol of nitric oxide.

4. The process of claim 1 in which cooling medium is applied externally to the reactor during the course of the reaction.

5. The process of claim 1 in which the reactor is substantially enveloped in a fluid maintained at temperature substantially in the range of zero–minus 135° C.

6. The process of claim 1 in which the reactor is substantially enveloped in a fluid maintained at temperature substantially in the range of minus 50–minus 130° C.

7. The process for making trifluoroamine oxide which comprises introducing into and bringing together in the reaction zone of a reactor gaseous elemental fluorine and gaseous nitric oxide, regulating relative rates of feed of fluorine and of nitric oxide and relative proportions of fluorine and of nitric oxide so as to maintain in the reaction zone spontaneous exothermic reaction of fluorine and nitric oxide, abruptly discharging reaction zone reaction products into a quenching zone and immediately shock-cooling said reaction products therein to temperature substantially in the range of minus 110–minus 135° C., and discharging trifluoroamine oxide from the quenching zone.

8. The process for making trifluoroamine oxide which comprises introducing into and bringing together in the reaction zone of a reactor gaseous elemental fluorine and gaseous nitric oxide, regulating relative rates of feed of fluorine and of nitric oxide and relative proportions of fluorine and of nitric oxide so as to maintain in the reaction zone spontaneous exothermic reaction of fluorine and nitric oxide, abruptly discharging from reaction zone reaction products containing F₃NO and NOF into a quenching zone and immediately shock-cooling said reaction products therein to temperature above about minus 135° C. but low enough to effect at least incipient liquefaction of F₃NO and NOF, and discharging reaction products containing trifluoroamine oxide from the quenching zone.

9. The process of claim 7 in which fluorine and nitric oxide are charged in proportions of not less than one mol of fluorine per mol of nitric oxide.

10. The process of claim 7 in which the reactor is substantially enveloped in a fluid maintained at temperature substantially in the range of minus 50–minus 130° C.

11. The process for making trifluoroamine oxide which comprises introducing into and bringing together in the reaction zone of a reactor gaseous elemental fluorine and gaseous nitric oxide, regulating relative rates of feed of fluorine and nitric oxide in relative proportions of fluorine and of nitric oxide so as to maintain in the reaction zone spontaneous exothermic reaction of fluorine and nitric oxide, abruptly subjecting reaction zone reaction products in a contiguous quenching chamber to immediate shock-cooling, said reactor and said quenching chamber each being substantially enveloped in a fluid medium maintained at temperature substantially in the range of minus 110–minus 135° C., and discharging trifluoroamine oxide from the quenching chamber.

12. The process of claim 11 in which fluorine and nitric oxide are charged in proportions of substantially one–2.5 mols of fluorine per mol of nitric oxide.

13. The process of claim 11 in which fluorine and nitric oxide are charged in proportions of not more than about 1.5 mols of fluorine per mol of nitric oxide, and the reactor and the quenching chamber are substantially enveloped in a common liquid bath maintained at temperature of substantially minus 125–minus 130° C.

References Cited

UNITED STATES PATENTS

| | | | |
|---|---|---|---|
| 3,032,400 | 5/1962 | Marsh | 23—203 |
| 3,043,662 | 7/1962 | Lipscomb | 23—203 |

MILTON WEISSMAN, Primary Examiner.

CARL D. QUARFORTH, OSCAR R. VERTIZ,
*Examiners.*

J. D. VOIGHT, Assistant Examiner.